United States Patent Office 3,376,293
Patented Apr. 2, 1968

3,376,293
FLUORO STEROIDS AND METHODS OF PREPARING THE SAME
Henry M. Kissman, Nanuet, N.Y., and Martin J. Weiss, Oradell, N.J., assignors to American Cyanamid Company, New York, N.Y., a corporation of Maine
No Drawing. Continuation-in-part of application Ser. No. 778,595, Dec. 8, 1958. This application Jan. 18, 1960, Ser. No. 2,838
21 Claims. (Cl. 260—239.55)

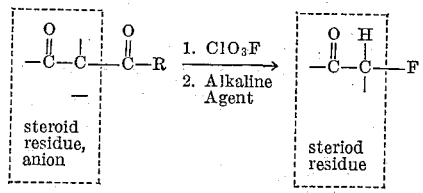

ABSTRACT OF THE DISCLOSURE

A process of preparing fluorine derivatives of the pregnane and androstane series and new steroids resulting therefrom by reacting a salt the anion of which is derived from beta-dicarbonyl pregnane or beta-dicarbonyl androstane with perchloryl fluoride and subsequently with an alkaline agent in a hydrolytic solvent, is described. The products of the process are useful agents in one or more of the following glucocortoid, and androgenic and progestational fields.

The present application is a continuation-in-part of our copending application Ser. No. 778,595, filed Dec. 8, 1958, now abandoned.

This invention relates to a new method of preparing fluorine substituted steroids. More particularly, it relates to fluoro steroids of the pregnane and androstane series.

It is well known that fluorine substituted steroids such as 9α-fluoro-16-α-hydroxypredisolone(triamcinolone) are highly active and useful antiarthritics. In U.S. Patent 2,857,403, 16α-fluorotestosterone is described as an active androgen. In the chemical literature, 21-fluoroprogesterone is reported to have two to four times the progestational activity of progesterone. Also published reports indicate that the introduction of fluorine at the 6α-position on the steroid nuclear has profound effect on activity. Substitution of fluorine at the 12α-position also produces highly active glucocorticoids. A process capable of putting one or more fluorine atoms into a steroid molecule is therefore highly desirable. The products of this invention are active and useful agents in one or more of the following glucocorticoid, androgenic and progestational fields. Certain of the compounds prepared by the present process are also useful as intermediates.

We have now found that steroids, particularly of the keto-pregnane and keto-androstane series having the group

present which is alpha to a carbonyl group are capable, via the corresponding anion, of direct fluorination.

In this group, R is defined as hydrogen, hydroxy, carbalkoxy or a carboxy radical. The

group is usually attached to the steroid nucleus; however, it can be attached to the side chain as in the pregnane series. The following illustrates the reaction which takes place.

in which R is as defined above.

The process of the present invention is capable of inserting at least one fluorine atom in any position on the steroid ring system where a methylene or methyl group is alpha to a carbonyl group of the steroid nucleus. This would include the 2, 4, 16 and 21 positions. In the instance of the 21 position, the present process will insert one or two fluorine atoms depending upon the procedure used.

The starting materials used in the process of the present invention have been described in the prior art. The examples hereinafter include appropriate reference to the starting materials.

The present process is carried out by dissolving or suspending a carbon-acylated steroid of the keto-pregnane or the keto-androstane series as hereinbefore described in a solvent such as an aromatic hydrocarbon, a glycol, an alkoxy alcohol, dioxane pyridine, dimethylformamide or, preferably, a lower aliphatic alcohol and adding thereto, if necessary, one equivalent of an alkaline agent sufficiently strong to form a salt of the steroid. These alkaline agents can be, for example, potassium hydroxide, sodium hydroxide, sodium methoxide, sodium ethoxide, sodium hydride and the like. The resulting solution or suspension is then maintained at a temperature of from about −60° C. to 50° C. and preferably within the range of about −20° to 0° C. while the perchloryl fluoride is bubbled through the reaction mixture until the reaction is substantially complete. This may require a period of from several minutes to one to two hours. Following completion of the reaction, the product is obtained by appropriate treatment with a hydrolytic solvent such as water or an alcohol or mixture thereof and an alkaline agent such as a metal salt of a weak acid or an alkali metal alkoxide or by treatment with dilute mineral acid. This procedure effects deacylation and gives the desired fluoro steroid.

In the examples which follow the newly introduced fluorine atoms have been assigned the alpha-configuration. This designation of configuration has been made in order to provide a more complete exposition of the present invention and in order that the specification shall constitute a more useful contribution to the art. However, the designated configuration is based on an analysis of infrared and ultraviolet absorption data presently appearing in the chemical literature and is therefore not to be interpreted except in relation to the state of the art presently known to organic chemists. It will be apparent that no part of the specification will be materially defective if it should later be established that the configuration is the opposite of that deducible from data presently available to workers in the field.

The following examples describe in detail the process of fluorination of steroids of the pregnane and androstane series.

Example 1.—Preparation of 20-ethylenedioxy-2α-fluoro-11β,17α,21-trihydroxyprogesterone To a cooled solution (−10°) of 0.535 g. (1.08 millimole) of 20-ethylenedioxy-2-methoxalyl-11β,17α,21-trihydroxyprogesterone (Australian application 23,672) in 25 cc. of absolute methanol is added 1.08 cc. of a 1 N methanolic sodium methoxide solution. Into the stirred solution is bubbled a vigorous stream of perchloryl fluoride for a few minutes. The mixture is then allowed to come to room temperature and is evaporated under reduced pressure. The residue is dissolved in a mixture of 20 cc. of chloroform and 6 cc. of water. The layers are separated and the water layer is washed further with chloroform. The combined chloroform layers are washed with a little water, dried over magnesium sulfate, filtered and evaporated under reduced pressure. The residue is redissolved in 10 cc. of methanol containing 0.19 g. of potassium acetate. The solution is allowed to reflux for one hour and is then evaporated under reduced pressure. The residue is mixed with 30 cc. of chloroform and 10 cc. of water and the layers are separated. The water layer is further extracted with a little chloroform and the combined chloroform layers are washed with a little water, dried over magnesium sulfate, filtered and evaporated under reduced pressure. The residue is crystallized from ether to give 0.2 g. of product M.P. 224–226° C. Recrystallization from ethyl acetate afforded material with M.P. 224–226° C.;

$$\lambda_{max.}^{MeOH} \ 242 \ m\mu \ (\epsilon \ 14,000)$$

Example 2.—Preparation of 2α-fluoro-11β,17α,21-trihydroxyprogesterone (2α-fluorohydrocortisone)

To a solution of 0.622 g. (1.46 millimole) of 20-ethylenedioxy-2α-fluoro-11β,17α,21-trihydroxyprogesterone in 50 cc. of methanol is added 2 cc. of an 8% aqueous sulfuric acid solution. The mixture is allowed to reflux for one hour. Solvent is then distilled under reduced pressure while water is being added occasionally so as to keep the volume at approximately 40–50 cc. The cooled mixture is extracted thoroughly with chloroform and the combined extracts are washed with water, dried over magnesium sulfate, filtered and freed from chloroform under reduced pressure. The residue is crystallized from methylene chloride-ether to give 0.407 g. of crystalline solid with M.P. 216–220° C.

$$\lambda_{max.}^{MeOH} \ 241 \ m\mu \ (\epsilon \ 14,800)$$

Example 3.—Preparation of 21-fluoro-3β-hydroxy-5-pregnene-20-one

To a cooled (−20°) solution of 1.8 g. (4.1 millimole) of 21-ethoxalyl-3β-hydroxy-5-pregnene-20-one sodium salt [Chem. Ber., 88, 878 (1955)] is added 4.1 cc. of a 1 N sodium methoxide solution. Into the stirred solution is passed a vigorous stream of perchloryl fluoride gas for a few minutes. The mixture is allowed to come to room temperature and is evaporated to a volume of about 30 cc. under reduced pressure. To the solution is added 2 g. of potassium acetate and the mixture is allowed to reflux for 1¼ hours and is then evaporated under reduced pressure. The residue is mixed with chloroform and water and the layers are separated. The water layer is extracted with some more chloroform and the combined chloroform extracts are washed with a little water, dried over magnesium sulfate, filtered and evaporated under reduced pressure. The residue is crystallized from ether to give 0.92 g. of product, which can be recrystallized from methylene chloride-ether to give material melting at 184–185° C.; $[\alpha]_D^{26}$ +36.9° (c. 1.03 in chloroform).

Example 4.—Preparation of 21-fluoroprogesterone

To an azeotropically dried solution of 0.415 g. of 21-fluoro-3β-hydroxy-5-pregnene-20-one in 25 cc. of toluene and 3.8 cc. of cyclohexanone is added 2 cc. of aluminum isopropoxide (1 cc. of the toluene solution represented 0.252 g. of isopropoxide). The mixture is refluxed for 1¼ hours and is then steam distilled. The aqueous mixture is evaporated to dryness under reduced pressure and the residue is mixed with 35 cu. of 5% aqueous hydrochloric acid solution and with 50 cc. of ether. The layers are separated and the water phase is extracted thoroughly with ether. The combined ether extracts are washed with water and are then dried over magnesium sulfate, filtered and freed from solvent under reduced pressure. The residue is crystallized and recrystallized from ether; 0.23 g., M.P. 143–145°; $[\alpha]_D^{26}$ +206° (c. 1.005 in chloroform;

$$\lambda_{max.}^{MeOH} \ 240 \ m\mu \ (\epsilon \ 17,050)$$

Example 5.—Preparation of 3-ethylenedioxy-16α-fluoro-5-androsten-17-one

Sodium (0.075 g.) is dissolved in a mixture of 30 cc. of benzene and 2 cc. of methanol. Solvent is then distilled from the stirred mixture until the distillation temperature reaches 80° C. To the resulting stirred suspension is then added 1 g. of dried 3-ethylenedioxy-5-androstene-3,17-dione [J. Am. Chem. Soc. 76, 1359 (1954)] and 1 cc. of ethyl oxalate. The mixture is stirred at room temperature for 16 hours and is then extracted with several portions of 1% aqueous potassium hydroxide. The extracts are added to a 30% aqueous sodium dihydrogen-phosphate solution which is in turn extracted several times with chloroform. The combined chloroform extracts are washed with a little water, dried over magnesium sulfate and freed from solvent under reduced pressure. The residue is crystallized from ether to afford 0.795 g. of a white crystalline solid and can be recrystallized to give a material with melting point 161–163° C.; $[\alpha]_D^{25}$ −103° (c. 0.793 CHCl$_3$). To a solution of 1.67 g. of 16-ethoxalyl-3-ethylenedioxy-5-androsten-17-one, prepared as above, in 40 cc. of methanol which had been cooled to −10° is added 6 cc. of 1 N methanolic sodium methoxide solution. The stirred solution is saturated with perchloryl fluoride gas at −10° C. and the mixture is evaporated under reduced pressure. The residue is partitioned between water and chloroform and the water phase is extracted several times with small portions of chloroform. The combined chloroform extracts are washed with a little water, dried over magnesium sulfate and evaporated under reduced pressure. The residue is redissolved in 40 cc. of methanol and 3 g. of potassium acetate is added to the solution which is then kept under reflux for 1.5 hours. The mixture is evaporated under reduced pressure and the residue is partitioned between water and chloroform. The water phase is extracted with chloroform and the combined chloroform extracts are washed with water, dried over magnesium sulfate and evaporated under reduced pressure. The residue is crystallized from ether to give 0.323 g. of a white crystalline solid with melting point 226–232° C.

Example 6.—Preparation of 3-ethylenedioxy-16α-fluoro-17β-hydroxy-5-androstene To a suspension of 3-ethylenedioxy-16α-fluoro-5-androsten-17-one (0.348 g.) in 10 cc. of methanol and 0.5 cc. of water is added 0.175 g. of sodium borohydride and the stirred mixture is kept under reflux for 3 hours. It is then poured into 25 cc. of water and is extracted with several portions of chloroform. The combined chloroform extracts are washed with a little water, dried over magnesium sulfate and freed from solvent under reduced pressure. The residue is crystallized from methanol to give 0.307 g. with melting point 189–195° C.

Example 7.—Preparation of 16α-fluorotestosterone

A solution of 0.3 g. of 3-ethylenedioxy-16α-fluoro-17β- hydroxy-5-androstene-3-one in 20 cc. of methanol containing 1 cc. of 8% aqueous sulfuric acid is allowed to reflux for one hour and then diluted with 30 cc. of methanol. The solution is stirred with a weakly basic anion exchange resin (OH form) until neutral. The resin is removed by filtration and is washed thoroughly with methanol. Filtrate and washings are combined and freed from solvents under reduced pressure. The residue is crystallized from ether to give 0.17 g. of a white crystalline substance with melting point 154–155° C. $[\alpha]_D^{25}$ +117° (c. 0.501 in $CHCl_3$);

$$\lambda_{max.}^{MeOH}\ 240\ m\mu\ (\epsilon,\ 15{,}800)$$

Example 8.—Preparation of 2α,21-difluoroprogesterone

Sodium (0.505 g.) is dissolved in a mixture of 80 cc. of benzene and 5 cc. of methanol. Solvent is then distilled from the solution until the distillation temperature reaches 80° C. To the cooled suspension is added 5 g. of ethyl oxalate and the mixture is stirred until the sodium methoxide is dissolved. There is then added 3.14 g. of dried progesterone and the mixture is stirred at room temperature for 24 hours. A heavy yellow precipitate forms during this time and 100 cc. of dry ether is added to complete precipitation. The solid is collected by filtration, washed with ether and dried under reduced pressure. There is thus obtained 5.87 g. of the disodium salt of 2,2-bisethoxalylprogesterone. This material is redissolved in 60 cc. of methanol, mixed with 20 cc. of 1 N methanolic sodium methoxide solution and the stirred mixture is cooled to −20° C. Perchloryl fluoride is passed into the stirred mixture at this temperature until the yellow color has disappeared. The mixture is evaporated partially under reduced pressure and there is then added 3 g. of potassium acetate. The reaction mixture is allowed to reflux for 1.5 hours and is then evaporated under reduced pressure. The residue is distributed between water-chloroform and the aqueous phase is extracted several times with chloroform. The combined chloroform extracts are washed with a little water, dried over magnesium sulfate and freed from solvent under reduced pressure. The residual gum is crystallized from ether to yield 1.6 g. of a crystalline product; M.P. 179–180° C.; $[\alpha]_D^{25}$ +218° (c. 0.837 in $CHCl_3$);

$\lambda_{max.}^{MeOH}\ 242\ m\mu_a\ (\epsilon,\ 15{,}100);\ \lambda_{max.}^{KBr}\ 5.80\mu$ and $5.92\mu$ (carbonyl region)

Example 9.—Preparation of 21,21-difluoro-3-hydroxy-5-pregnene-20-one

The sodium salt of 21-ethoxalyl-3-hydroxy-5-pregnene-20-one [Chem. Ber. 88, 878 (1955)] (0.9 g.) is suspended in 30 cc. of methanol and 4.1 cc. of 1 N methanolic sodium methoxide is added. The stirred mixture is cooled to −10° C. and perchloryl fluoride gas is passed in for a few minutes. The mixture is then evaporated partially under reduced pressure to remove excess perchloryl fluoride. Another 4.1 cc. portion of the sodium methoxide solution is added and the mixture is again cooled to −10° C. and is then saturated with perchloryl fluoride. This treatment with methoxide and perchloryl fluoride is repeated once more and the reaction mixture is then partially evaporated, mixed with 1 g. of potassium acetate and kept at the boiling point for one hour. The suspension is evaporated under reduced pressure and the residue is distributed between water and chloroform. The water phase is extracted with several portions of chloroform and the combined chloroform extracts are washed with water, dried over magnesium sulfate and freed from solvent under reduced pressure. The residue is crystallized from ether to give 0.467 g. of a white crystalline solid which can be recrystallized from ether, M.P. 150–154° C.

Example 10.— Preparation of 21,21-difluoroprogesterone

To a solution of 0.415 g. of 21,21-difluoro-3β-hydroxy-5-pregnene-20-one in 25 cc. of toluene is added 3.8 cc. of cyclohexanone. Solvent is distilled from the mixture until 5 cc. has been collected. There is then added 0.5 g. of aluminum isopropoxide in 2 cc. of toluene and the mixture is allowed to reflux for 1¼ hours. Some 6 cc. of distillate are collected during this period. The reaction mixture is evaporated under reduced pressure and the residue is mixed with 25 cc. of 1 N hydrochloric acid. This mixture is extracted with several portions of ether and the combined ether extracts are washed with water, dried over magnesium sulfate and evaporated under reduced pressure. The residue is crystallized from pentane to give 0.273 g. of a white crystalline solid; M.P. 137–140° C.;

$\lambda_{max.}^{KBr}\ 5.77\mu$ and $6.03\mu$ (carbonyl region)

Example 11.—Preparation of 2α-fluorotestosterone

Sodium (0.092 g.) is dissolved in a mixture of 30 cc. of benzene and 2 cc. of methanol. Solvent is distilled from the stirred mixture until the distillation temperature reaches 80° C. To the suspension is then added 0.576 g. of dried testosterone and 1 g. of dried methyl oxalate. The mixture is stirred at room temperature for 16 hours and is then mixed with cold 1% potassium hydroxide (10 cc). The organic phase is separated and washed with another two 10 cc. portions of potassium hydroxide solution. The combined basic extracts are added to an ice cold mixture of 30 cc. of 0.1 N sulfuric acid and chloroform. The acid layer is separated and extracted several times with chloroform. The combined chloroform extracts are washed with water, dried over magnesium sulfate and freed from solvent under reduced pressure. There is obtained 0.4 g. of a yellow amorphous solid. To a cooled (−10° C.) solution of 2-methoxalyl-17β-hydroxy-4-androsten-3-one (1.8 g.), prepared as described above, in 50 cc. of methanol is added 5.8 cc. of 1 N methanolic sodium methoxide. The stirred solution is saturated with perchloryl fluoride gas and is then evaporated under reduced pressure. The residue is partitioned between chloroform and water and the aqueous phase is extracted several times with small portions of chloroform. The combined chloroform extracts are washed with water, dried over magnesium sulfate and evaporated under reduced pressure. The residue is redissolved in 40 cc. of methanol and to the solution is added 1 g. of potassium acetate. The mixture is allowed to reflux for 1¼ hours and is evaporated to dryness under reduced pressure. The residue is partitioned between water and chloroform and the water phase is extracted several times with chloroform. The combined chloroform extracts are washed with water, dried over magnesium sulfate and evaporated under reduced pressure. The residue is crystallized from methylene chloride-ether to afford 0.724 g. of a white solid with melting point 149–151° C.

Example 12.—Preparation of 2α-fluorotestosterone from 2-hydroxymethylenetestosterone (2-hydroxymethylene-17β-hydroxy-4-androsten-3-one)

To solution of 1.05 g. of 2-hydroxymethylenetestosterone (F. Weisenborn et al. J. Amer. Chem. Soc., 76, 552, 1954) in 20 ml. of methanol, cooled to −10°, is added 3 ml. of a 1 N methanolic sodium methoxide solution. The stirred, cooled mixture is treated with perchloryl fluoride gas for a few minutes and is then evaporated under reduced pressure. The residue is dissolved in a mixture of chloroform and water and the organic phase is dried over magnesium sulfate and is then evaporated under reduced pressure. The residue containing 2-fluoro-2-formyltestosterone is redissolved in 30 ml. of methanol and there is added 1 g. of anhydrous potassium acetate. The mixture is allowed to reflux for 1 hour and is then evaporated under reduced pressure. The residue is again distributed between water and chloroform and the chloroform phase is washed once with water and is dried over magnesium sulfate and freed from solvent under reduced pressure. The residue is crystallized from methylene chloride-ether to give 2α-fluorotestosterone.

Example 13.—Preparation of 2-carboxytestosterone (2-carboxy-17β-hydroxy-4-androsten-3-one)

To a solution of 5.79 g. of testosterone in 15 ml. of dimethylformamide is added 40 ml. of a 2.8 M solution of magnesium methyl carbonate in dimethylformamide [M. Stiles and H. L. Finkbeiner J. Amer. Chem. Soc. 81, 505 (1959)]. The stirred mixture is kept at 120° for two hours under a blanket of nitrogen and is then allowed to come to room temperature. The viscous mixture is added to a mixture of sulfuric acid and ice, and the resulting precipitate is filtered and washed free from sulfuric acid with ice water. The precipitate is dried over phosphorus pentoxide under reduced pressure. For further purification, the solid is dissolved in cold 0.1 sodium hydroxide and the solution is quickly extracted with ether. The aqueous phase is acidified with ice sulfuric acid and the resulting precipitate of 2-carboxytestosterone is collected, washed with ice-water and dried as before;

$\lambda_{max.}^{MeOH}$ 242 m$\mu$ ($\epsilon$, 15,300); $\lambda_{max.}^{KBr}$ 5.82$\mu$, 6.01$\mu$, 6.20$\mu$ Example 14.—Preparation of 2α-fluorotestosterone from 2-carboxytestosterone The viscous mixture containing the magnesium salt of 2-carboxytestosterone (prepared from 1.4 g. of testosterone as described in the preceeding example) in dimethylformamide is diluted with 10 cc. of dimethylformamide and is cooled to −5° C. Perchloryl fluoride is bubbled through the stirred mixture until all the solid had gone into solution. Nitrogen gas is then blown through the solution in order to displace excess perchloryl fluoride and the solution is poured into 200 cc. of cold 6 N hydrochloric acid. The resulting precipitate of 2-carboxy-2-fluorotestosterone is collected, washed thoroughly with water and is dried under reduced pressure. The precipitate is then suspended in 3 N hydrochloric acid and the stirred mixture is heated to 70° C. for 20 minutes to effect decarboxylation. The cooled suspension is extracted with chloroform and the extracts are washed successively with sodium bicarbonate solution and with water. The dried chloroform solution is evaporated under reduced pressure and the residue is crystallized and recrystallized from methylene chloride-ether to afford 2α-fluorotestosterone (2α-fluoro-17β-hydroxy - 4-androsten-3-one) with $\lambda_{max.}^{MeOH}$ 240 m$\mu$ ($\epsilon$ 15,112); $\lambda_{max.}^{KBr}$ 5.90$\mu$ Example 15.—Preparation of 17β-acetoxy-2α-fluorotestosterone (17β-acetoxy-2α-fluoro-4-androsten-3-one)

To a solution of 612 mg. of 2α-fluorotestosterone (2α-fluoro-11β-hydroxy-4-androsten-3-one) in 7 cc. of ice cold pyridine is added 1 cc. of acetic anhydride and the mixture is kept in an ice bath for 1 hour and at room temperature overnight. It is then poured into 50 cc. of ice water and the solid which precipitates out on standing is collected and washed with water. The air dried material is crystallized and recrystallized from acetone-hexane;

$\lambda_{max.}^{MeON}$ 240 m$\mu$ ($\epsilon$, 15,100); $\lambda_{max.}^{KBr}$ 5.79$\mu$ and 5.90$\mu$ (carbonyl region)

Example 16.—Preparation of 17β-propionoxy-2α-fluorotestosterone (2α-fluoro-17β-propionoxy - 4-androsten-3-one)

To an ice-cold solution of 612 mg. of 2α-fluorotestertone (2α-fluoro-17β-hydroxy-androsten-3-one) in 7 cc. of pyridine is added 1 cc. of propionic anhydride and the solution is stirred in an ice bath for several hours and is kept at room temperature overnight. The mixture is poured into 50 cc. of ice water and the solid which precipitates out on standing is collected, washed with water and is dried under reduced pressure. The material is recrystallized from acetone-hexane;

$\lambda_{max.}^{MeOH}$ 241 m$\mu$ ($\epsilon$, 15,000); $\lambda_{max.}^{KBr}$ 5.78$\mu$ and 5.90$\mu$ (carbonyl region)

Example 17.—Preparation of 17β-isobutoxy-2α-fluorotestosterone (2α-fluoro-17β-isobutoxy-4-androsten-3-one)

To an ice-cold solution of 612 mg. of 2α-fluorotestosterone (2α-fluoro-17β-hydroxy-4-androsten-3-one) in 7 cc. of pyridine is added 1.8 cc. of isobutyric anhydride and the solution is stirred in an ice bath for 2 hours and at room temperature for 16 hours. The solution is poured into ice water, extracted with several portions of methylene chloride and the combined extracts are washed successively with saturated sodium bicarbonate solution and water. The combined methylene chloride extracts are then dried over magnesium sulfate and are evaporated under reduced pressure. Last traces of pyridine are removed by evaporation with toluene. The residue is crystallized and recrystallized from acetone-hexane;

$\lambda_{max.}^{MeOH}$ 239$\mu$ ($\epsilon$, 15,130); $_{max.}^{KBr}$ 5.79$\mu$ and 5·90$\mu$ (carbonyl region)

Example 18.—Preparation of 9α-fluoro-11β-hydroxy-16α, 17α-isopropylidenedioxy - 21 - (tetrahydropyran - 2-yloxy)-progesterone A solution of 0.5 g. of 11β,21-dihydroxy-9α-fluoro-16α, 17α-isopropylidenedioxyprogesterone [J. Amer. Chem. Soc., 80, 2338 (1958)] in 20 cc. of dihydropyran is cooled to 0° C. There is added with stirring dropwise 1 cc. of concentrated hydrochloric acid at a rate slow enough to keep the internal temperature between 10–20°. The mixture is then stirred at room temperature for one hour. Hexane (100 cc.) is added and the mixture is cooled in the refrigerator overnight. The solid which precipitates out during this time is collected by filtration and is washed thoroughly with hexane and is air dried. The substance is recrystallized from ethyl acetate to afford 0.4 g. with M.P. 200–205°;

$\lambda_{max.}^{KBr}$ 5.80$\mu$ and 5.96$\mu$ (carbonyl region)

Example 19.—Preparation of 2-ethoxalyl-9α-fluoro-11β-hydroxy - 16α,17α-isopropylidenedioxy-21-(tetrahydropyran-2-yloxy)-progesterone A solution of 0.389 g. of sodium in 8 cc. of methanol and 126 cc. of benzene is distilled until the distillation temperature reaches 80° C. To the cooled solution is then added 3 cc. of ethyl oxalate and 2.7 g. of 9α-fluoro-11β-hydroxy - 16α,17α-isopropylidenedioxy - 21-(tetrahydropyran-2-yloxy)-progesterone and the reaction mixture is stirred at room temperature for 16 hours. Some 250 cc. of ether is added and the dark red mixture is extracted 10 times with 25 cc. portions of ice cold 1% aqueous potassium hydroxide solution. The extracts are washed with ether and are then poured into enough 30% sodium dihydrogen phosphate solution to keep the mixture at pH 5–6. This mixture is in turn extracted quickly with several portions of chloroform and the combined extracts are washed with water, dried over magnesium sulfate, filtered and evaporated under reduced pressure. The yellow residue (2.5 g.) is chromatographed on 50 g. of silica gel from benzene. Elution with benzene containing increasing amounts of anhydrous ether brings down 0.8 g. of 2-ethoxalyl-9-α-fluoro-11β-hydroxy - 16α,17α-isopropylidenedioxy - 21-(tetrahydropyran - 2-yloxy)-progesterone as a yellow, amorphous solid which gives a strong positive ferric chloride test.

Example 20.—Preparation of 2α,9α-difluoro-11β-hydroxy-16α,17α-isopropylidenedioxy - 21 - (tetrahydropyran-2-yloxy)-progesterone To a cold (−10° C.) solution of 0.62 g. of 2-ethoxalyl-9α-fluoro-11β-hydroxy-16α,17α-isopropylidenedioxy - 21-(tetrahydropyran-2-yloxy)-progesterone in 30 cc. of methanol is added 2 cc. of a 1 N methanolic sodium methoxide solution. Perchloryl fluoride gas is passed into solution until the latter is neutral. The mixture is then evaporated under reduced pressure and the residue is dissolved in a mixture of water and chloroform. The layers are separated and the water phase is extracted with several portions of chloroform. The combined chloroform extracts are washed with a little water, dried over magnesium sulfate and evaporated under reduced pressure. The residue is redissolved in 30 cc. of methanol and to the solution is added 1 g. of potassium acetate. The mixture is allowed to reflux for one hour and is then evaportaed under reduced pressure. The residue is partioned between water and chloroform and the water phase is extracted with several portions of chloroform. The combined chloroform extracts are washed with a little water, dried over magnesium sulfate and freed from solvent under reduced pressure. The residue (0.5 g.) is dissolved in benzene (5 cc.) and the colored solution is added to a column (13 x 1.5 cm.) of 15 g. of silica gel which had been wetted down with benzene. Elution of the column with 100 cc. of benzene and 100 cc. of 15% benzene-ether affords fractions which are discarded. Further elution with 100 cc. of ether yields, after evaporation under reduced pressure, 0.25 g. of crystalline material which is recrystallized from ether to give 0.14 g. of product as a white crystalline solid; M.P. 210–212° C.;

$\lambda_{max.}^{KBr}$ 5.81μ and 5.92μ (carbonyl region)

Example 21.—Preparation of 2α,9α-difluoro-11β,21-dihydroxy-16α,17α-isopropylidenedioxy-progesterone A solution of 0.3 g. of 2α,9α-difluoro-11β-hydroxy-16α,17α - isopropylidenedioxy-21-(tetrahydropyran-2-yloxy)-progesterone in 90 cc. of methanol and 15 cc. of water containing 1.5 cc. of 8% aqueous sulfuric acid is stirred at room temperature for one hour. The solution is then neutralized by mixing it with a weakly basic anion exchange resin (OH form). The resin is removed by filtration and is washed with methanol. The filtrate and washings are combined and evaporated under reduced pressure. This leaves 0.19 g. of a white solid which showed $\lambda_{max.}^{KBr}$ 5.79μ and 5.92μ (carbonyl region)

Example 22.—Preparation of 2α,9α-difluoro-11β-21-dihydroxy-16α,17α-isopropylidenedioxyprogesterone - 21-acetate To a cooled solution of 1.14 g. of 2α,9α-difluoro-11β,21-dihydroxy-16α,17α-isopropylidenedioxyprogesterone in 12.5 cc. of dry pyridine was added 2.5 cc. of acetic anhydride and the mixture is stirred in an ice bath for one hour and at room temperature for 16 hours. The mixture is then poured into 150 cc. of ice water and the resulting precipitate is collected, washed with water and dried in air. For further purification, the solid is dissolved in chloroform and the solution is washed with a little water and is dried over magnesium sulfate and evaporated under reduced pressure. The residue is crystallized from ether to afford a colorless powder with melting point 269–279°, $\lambda_{max.}^{KBr}$ 5.69μ, 5.76μ and 5.89μ (carbonyl region) $\lambda_{max.}^{MeOH}$ 239 mμ ($\epsilon$, 15,000)

Example 23.—Preparation of 2α,9α-difluoro-21-hydroxy-16α,17α-isopropylidenedioxy-4-pregnene-3,11,20-trione Chromic oxide (850 mg.) is added to 7 cc. of chilled pyridine and the resulting chromic oxide-pyridine complex is transferred to a cold solution of 1.06 g. of 2α,9α-difluoro - 11β,21-dihydroxy-16α,17α-isopropylidenedioxy-progesterone 21-acetate in 11 cc. of pyridine. The mixture is stirred in an ice bath for 1 hour and at room temperature for 16 hours. Pyridine is then removed under reduced pressure and the residue is thoroughly extracted with ethyl acetate. The ethyl acetate suspension is filtered through diatomaceous earth and the filtrate is washed with dilute sulfuric acid and with water. The solution is dried over magnesium sulfate, filtered and evaporated under reduced pressure. The residual, crystalline 2α,9α-difluoro-2-hydroxy-16α,17α-isopropylidenedioxy-4-pregnene - 3,11-trione 21-acetate is dissolved in 100 cc. of methanol and the solution is flushed with nitrogen. There is then added 2.5 cc. of a 1 N methanolic sodium methoxide solution and the mixture is stirred under nitrogen for 1 hour and is then neutralized with a few drops of acetic acid. The solvent is removed under reduced pressure and the residue is dissolved in a mixture of water and chloroform. The chloroform phase is washed with a little water and is dried over magnesium sulfate. The filtered solution is evaporated under reduced pressure and the residue is crystallized and recrystallized from ether to give the desired product with melting point 210–215° C., $\lambda_{max.}^{KBr}$ 5.80μ and 5.88μ (carbonyl region), $\lambda_{max.}^{MeOH}$ 234 mμ ($\epsilon$ 15,600)

Example 24.—Preparation of 2α-fluoroprogesterone

To 10.0 g. of 3β-hydroxy-pregnen-20-one is added 250 cc. of ethylene glycol and 25 cc. of ethylene glycol is distilled off at 15–20 mm. To the reaction mixture is added 0.450 g. p-toluenesulfonic acid and 25 cc. ethylene glycol, and material is slowly distilled at 15 mm. for 1 hour. The mixture is cooled in an ice bath, and the solid is collected by filtration, washed well with water and dried to yield 10.88 g. The product, 20-ethylenedioxy-3β-hydroxy-5-pregnen-20-one, is recrystallized from ethanol.

Some 40 cc. of distillate is collected from a mixture of 3.25 g. 20-ethylenedioxy-3β-hydroxy-5-pregnen-20-one prepared above, 180 cc. of toluene, and 27.66 cc. cyclohexanone. To the reaction mixture is added 14.55 cc. aluminum isopropoxide solution (concentration 0.25 g./cc. in toluene) and the mixture is stirred at reflux for 80 minutes with intermittent collection of distillate. The solvent is removed under reduced pressure, and the residue is triturated with ether to afford 1.63 g. The product is recrystallized from ether; M.P. 187–189°.

A solution of 0.114 g. of sodium in 3.7 cc. methanol and 45 cc. benzene is distilled until the distillation temperature reaches 80° C. To the cooled solution is then added 1.5 cc. ethyl oxalate and 1.63 g. 20-ethylenedioxyprogesterone prepared above in 20 cc. benzene, and the reaction mixture is stirred at room temperature for 21 hours. Some 200 cc. of ether is added to the red solution, and the mixture is extracted with several 30 cc. portions of ice cold 1% aqueous potassium hydroxide solution. The extracts are washed with ether and are then poured into enough 30% sodium dihydrogen phosphate solution to keep the mixture at pH 5–6. This mixture is in turn extracted quickly with several portions of chloroform, and the combined extracts are washed with water, dried over magnesium sulfate, treated with activated charcoal, filtered and evaporated under reduced pressure to leave 1.92 g. of 2-ethoxalyl-20-ethylenedioxyprogesterone as a yellow amorphous solid which gives a strong positive ferric chloride test.

To a cooled (−20°) solution of 1.92 g. 2-ethoxalyl-20-ethylenedioxyprogesterone prepared above in 50 cc. methanol is added 8.4 cc. 1 N methanolic sodium methoxide solution. The stirred, cooled mixture is saturated with perchloryl fluoride gas for three minutes and is then evaporated under reduced pressure. The residue is dissolved in a mixture of 30 cc. chloroform and 30 cc. water. The water phase is washed with two 10 cc. portions of chloroform, and the combined chloroform solutions are washed with a little water, dried over magnesium sulfate, filtered, and evaporated under reduced pressure. The residue is triturated with methanol to give white crystals of 20-ethylenedioxy-2α-fluoroprogesterone; M.P. 168–176°;

$\lambda_{max.}^{KBr}$ 5.91μ (carbonyl region)

A mixture of 1.3 g. of 20-ethylenedioxy-2α-fluoroprogesterone prepared above, 2.0 cc. 8% sulfuric acid, and 50 cc. methanol is refluxed for 80 minutes. The mixture is cooled to room temperature and neutralized with a weakly basic anion exchange resin (OH form). The resin is removed by filtration and washed well with methanol. The methanol washes and filtrate are evaporated under reduced pressure to leave 1.3 g. residue which is triturated with methanol to afford 0.67 g. white crystals. The 2α-fluoroprogesterone is recrystallized from methylene chloride-ether; M.P. 194–196°;

$\lambda_{max.}^{KBr}$ 5.91μ (carbonyl region)

Example 25.—Preparation of 2α-fluoro-21-hydroxy-4-pregnene-3,20-dione (2α-fluorodeoxycorticosterone)

To a suspension of sodium ethoxide (prepared from 0.1 g. of sodium) in 30 cc. of anhydrous benzene is added 0.833 g. (2 moles) of deoxycorticosterone acetate 20-ethylene ketal [F. Sondheimer and Y. Klibansky) Tetrahedron 5, 15 (1959)] and 2 cc. of diethyl oxalate. The mixture is stirred at room temperature for 16 hours and is then diluted with ether. The mixture is extracted with water and three times with 20 cc. portions of cold 1% aqueous potassium hydroxide solution. Each portion of extract is washed with a little ether and is added to a mixture of 30% sodium dihydrogen phosphate solution and chloroform. The layers are separated and the aqueous phase is extracted with additional portions of chloroform until these extracts no longer give a positive enol test (ferric chloride). The combined chloroform extracts are washed with water, dried and freed from solvents under reduced pressure to leave 0.89 g. of an orange gum. This is dissolved in 20 cc. of methanol, and to the cooled solution (−20° C.) is added 5 cc. of 1 N sodium methoxide solution. The mixture is saturated quickly with a vigorous stream of perchloryl fluoride and is then evaporated. The residue is dissolved in methylene chloride and the solution is washed with 2% aqueous sodium hydroxide and with water. The organic phase is dried over magnesium sulfate, evaporated and the residue is dissolved in methanol (20 cc.) containing 0.5 g. of potassium acetate. The mixture is kept under reflux for 70 minutes and is then evaporated. The residue is partitioned between water and methylene chloride and the organic phase is dried and evaporated. The residual 2α-fluorodeoxycorticosterone 20-ethylene ketal crystallizes when triturated with ether. It is collected and dissolved in 20 cc. of methanol containing 1 cc. of 8% aqueous sulfuric acid. The mixture is refluxed for 1 hour and is then neutralized by stirring with a weakly basic anion exchange resin and the suspension is freed from the resin by filtration. Evaporation of the filtrate gives a residue which is crystallized and recrystallized from ether; M.P. 138–141° C.;

$\lambda_{max.}^{MeOH}$ 242 mμ (ε 15,300); $\lambda_{max.}^{KBr}$ 5.90μ (with shoulder at 5.85μ)

Example 26.—Preparation of 2α-fluoro-21-hydroxy-4-pregnene-3,20-dione 21-acetate (2α-fluorodeoxycorticosterone acetate)

To a solution of 0.89 g. of 2α-fluoro-21-hydroxy-4-pregnene-3,20-dione in 7 cc. of chilled pyridine is added 1 cc. of acetic anhydride. The solution is stirred at room temperature for 16 hours and is then poured into 70 cc. of ice-water. The precipitate which forms on standing is collected, washed with water and dried under reduced pressure. The material is recrystallized from acetone-hexane to afford a product with $\lambda_{max.}^{KBr}$ 5.70μ and 5.90μ (carbonyl region); $\lambda_{max.}^{MeOH}$ 243 mμ (ε 15,100)

We claim:
1. A process of preparing fluorine derivatives of the pregnane and androstane series which comprises reacting a salt the anion of which is derived from the group consisting of a beta-dicarbonyl pregnane and a beta-dicarbonyl androstane with perchloryl fluoride and subsequently with an alkaline agent in the presence of a hydrolytic solvent.
2. A process of preparing fluorine derivatives of the pregnane series which comprises reacting a salt the anion of which is derived from an alpha-alkoxalyl keto-pregnane with perchloryl fluoride and subsequently with an alkaline agent in the presence of a hydrolytic solvent.
3. A process of preparing fluorine derivatives of the androstane series which comprises reacting a salt the anion of which is derived from an alpha-alkoxalyl keto-androstane with perchloryl fluoride and subsequently with an alkaline agent in the presence of a hydrolytic solvent.
4. A process of preparing 20-ethylenedioxy-2α-fluoro-11β,17α,21-trihydroxyprogesterone which comprises reacting an alkali metal salt of 20-ethylenedioxy-2-methoxalyl-11β,17α,21-trihydroxyprogesterone with perchloryl fluoride followed by reaction with an alkaline agent in a hydrolytic solvent.
5. A process of preparing 2α-fluoro-11β,17α,21-trihydroxy-progesterone which comprises reacting an alkali metal salt of 20-ethylenedioxy-2-methoxalyl-11β,17α,21-trihydroxy-progesterone with perchloryl fluoride subsequently hydrolyzing the reaction product with an alkaline agent followed by acid hydrolysis and recovering said compound.
6. A process of preparing 21-fluoro-3β-hydroxy-5-pregnene-20-one which comprises reacting 21-ethoxalyl-3β-hydroxy-5-pregnene-20-one sodium salt with perchloryl fluoride subsequently hydrolyzing the reaction product with an alkaline agent and recovering said compound.
7. A process of preparing 3-ethylenedioxy-16α-fluoro-5-androstene-3,17-dione which comprises reacting an alkali metal salt of 16 ethoxalyl 3-ethylenedioxy-5-androstene-3,17-dione with perchloryl fluoride and subsequently with an alkaline agent in a hydrolytic solvent.
8. A process of preparing 3-ethylenedioxy-16α-fluoro-17β-hydroxy-5-androstene-3-one which comprises reacting an alkali metal salt of 16 ethoxalyl 3-ethylenedioxy-5-androstene-3,17-dione with perchloryl fluoride treating the reaction product with an alkaline agent in a hydrolytic solvent and reducing the reaction product thereof with sodium borohydride.
9. A process of preparing 16α-fluorotestosterone which comprises reacting an alkali metal salt of 16 ethoxalyl 3-ethylenedioxy - 5-androstene - 3,17-dione with perchloryl fluoride treating the reaction product with an alkaline agent in a hydrolytic solvent and reducing the reaction product thereof with sodium borohydride followed by acid hydrolysis and recovering said product.
10. A process of preparing 2α-fluorotestosterone which comprises reacting an alkali metal salt of 2-methoxalyl testosterone with perchloryl fluoride and finally with an alkaline agent in a hydrolytic solvent.
11. A process of preparing 2α,21-difluoroprogesterone which comprises reacting the dialkali metal salt of 2,21-ethoxalylprogesterone with perchloryl fluoride and subsequently with an alkaline agent in a hydrolytic solvent.
12. A process of preparing 21,21-difluoro - 20-keto-pregnenes which comprises reacting an alkali metal salt of 21-ethoxalyl-20-keto-pregnene with perchloryl fluoride treating the reaction mixture with excess alkali metal alkoxide and subsequently with perchloryl fluoride and finally with an alkaline agent in a hydrolytic solvent.
13. A compound selected from the group consisting of 2α-fluoroprogesterone and 2α,21-difluoroprogesterone.
14. The compound 2α,21-difluoroprogesterone.
15. The compound 2α-fluoroprogesterone.
16. The compound 2α-fluorotestosterone.

17. The compound 2α,9α-difluoro - 11β,21-dihydroxy-16α,17α-isopropylidenedioxyprogesterone.

18. The compound 2α,9α-difluoro-21-hydroxy-16α,17α-isopropylidenedioxy-4-pregnene-3,11,20-trione.

19. The compound 16-ethoxalyl - 3-ethylenedioxy-5-androsten-17-one.

20. 21,21-Difluoro-Δ⁴-pregnene-3,20-dione.

21. A method for the production of a 21,21-difluoro-20-keto steroid of the pregnane series which comprises reacting a 21-alkoxyalyl-20-keto pregnane with perchloryl fluoride and treating the compound formed thereby with a base to form the corresponding 21,21-difluoro-20-keto-pregnane.

References Cited

UNITED STATES PATENTS

| | | | |
|---|---|---|---|
| 2,790,814 | 4/1957 | Hogg et al. | 260—239.55 |
| 2,862,011 | 11/1958 | Hogg et al. | 260—239.55 |

OTHER REFERENCES

Tannhauser et al.: J.A.C.S., 78, 2658, 1956.
Nathan et al.: J.O.C., 1395, Sept. 1959.
Nakanish et al.: J.A.C.S., 5259, Oct. 5, 1959.

LEWIS GOTTS, *Primary Examiner.*

L. H. GASTON, M. LIEBMAN, *Examiners.*

H. A. FRENCH, *Assistant Examiner.*